United States Patent Office 3,412,064
Patented Nov. 19, 1968

3,412,064
OLEFIN POLYMER COMPOSITION
Gordon D. Brindell, Wayne, N.J., assignor to Uniroyal, Inc., a corporation of New Jersey
No Drawing. Filed Nov. 8, 1965, Ser. No. 506,867
8 Claims. (Cl. 260—45.85)

ABSTRACT OF THE DISCLOSURE

Polypropylene is stabilized by addition of (1) a phenolic phosphite which is a reaction product of a substituted hydroquinone [e.g., di(t-butyl) hydroquinone] with phosphorus trihalide or triphenyl phosphite, with or without an alkyl phenol (e.g., nonylphenol), and (2) a dialkyl thiodipropionate (e.g., dilauryl thiodipropionate).

---

This invention relates to and is based on the surprising stabilization of olefin polymers by means of a phenolic phosphite.

The invention is directed to a composition comprising polypropylene stabilized with a phenolic phosphite which may be described as a reaction product of phosphorus trihalide or triphenyl phosphite with a reactant having two phenolic hydroxyl groups. Such reactant is either a hydroquinone or a bisphenol, as represented by the formula:

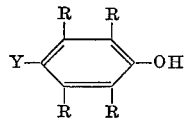

where R is hydrogen or alkyl and Y is hydroxyl or a group of the formula:

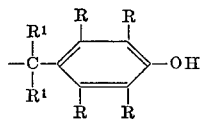

where R is as stated previously and R¹ is also hydrogen or alkyl. In one form of the invention, the phosphorus trihalide or triphenyl phosphite is reacted with a monophenol, preferably an alkyl monophenol, prior to reaction with the hydroquinone or bis-phenol.

In one important aspect the invention relates to a stabilized composition comprising, in admixture, (A) polypropylene, (B) a reaction product believed to be comprised of a material of the formula:

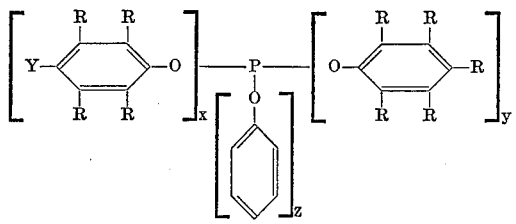

where $x$ is from 1 to 3, $y$ is from 0 to 2, $z$ is from 0 to 2 and $x+y+z=3$ (Y and R being as previouly defined), and (C) a dialkyl thiodipropionate.

As is well known in the art, olefin polymers, such as polypropylene, present a particular problem from the standpoint of stabilization against adverse influences such as heat and light. Ordinarily these adverse influences lead to degradation and discoloration of the polymer over a period of time, thereby seriously limiting the usefulness of the polymer. Many attempted solutions to this problem have been proposed but it has been desired to provide yet a more satisfactory solution.

This invention is directed particularly to the use of the subsequently described phenolic phosphite chemicals, in combination with a thiodipropionic ester, as a stabilizer combination for polypropylene. It has been found that this new combination produces a remarkable synergism for the protection of olefin polymer that could not have been foreseen from the known effects of thiodipropionic esters alone or from conventional phosphite stabilizers alone in said polymers.

The presently employed phenolic phosphites in synergistic combination with dialkyl thiodipropionates have been found to be unique as polypropylene stabilizers which is particularly evident in that:

(1) The synergistic combination provides a vast improvement in long term heat stability.

(2) The synergistic combination does not adversely affect light stability.

(3) The synergistic combination does not adversely affect color.

Of course, propylene copolymers with small amounts of other olefins, e.g., ethylene, etc., are equivalent to polypropylene in the way they are affected by the synergistic combination.

There is, of course, considerable literature on the stabilization of rubber and plastic compositions with aryl phosphites. Thus, Hunter, U.S. 2,733,266, describes alkylated phenyl phosphites which are useful as stabilizers. There are the type:

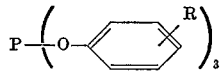

However, it has been desired to provide yet a more effective stabilizer system for polypropylene. Morris et al., U.S. 3,112,286, teaches the stabilization of rubber compounds with organic phosphite esters.

Nelson, U.S. 2,612,488, discloses aryl phosphite compositions and synthetic rubber compositions stabilized by same.

It has also been known previously to use combinations of phenols and phosphites for SBR stabilization such as taught by Nudenberg and Merrifield, U.S. 3,080,338. However, this particular combination was not workable in the invention described below.

Moran et al., U.S. 2,058,343, discloses the use of an aryl phosphite as a stabilizer for lubricating oils, which phosphites may contain hydroxy groups. None of the above cited art discloses a synergistic combination for olefin polymer stabilization comprising a phenolic phosphite and a dialkyl thiodipropionate such as is herein disclosed.

The presently employed phenolic phosphite chemicals are significantly different from the above cited patents in that the phosphite and phenolic are combined in the same molecule. I am of the belief that an important feature of these chemicals is that the molecule contains free phenolic groups. Rather than just being an aryl phosphite, the molecule is a phenolic phosphite, i.e., a hydroxyaryl phosphite. While it is not desired to limit the invention to any particular theory of operation it appears to be possible that the described remarkable new results obtained herein are in some way related to the presence on the molecule of a plurality of synergistically acting functional groups which in turn interact in the polypropylene with the dialkyl thiodipropionate in a highly advantageous manner that is not entirely understood at present.

The phenolic phosphite chemicals used in the invention are the reaction products of either one of two general types of reactions employed to make said reaction products. The first type of reaction is:

(1) 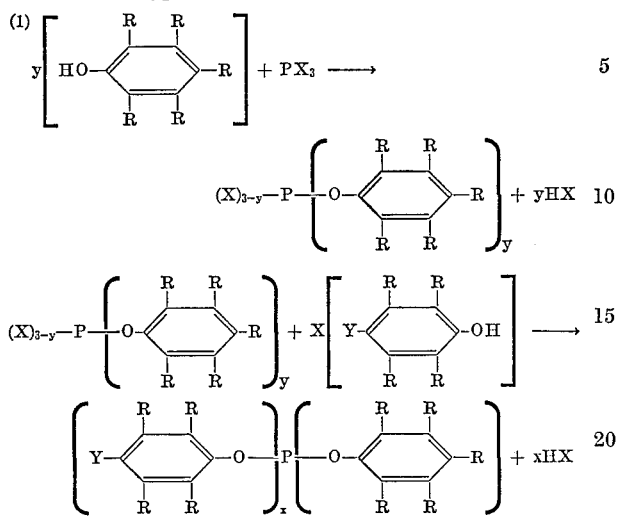

where $x$ is a number of from 1 to 3 inclusive, $y$ is a number of from 0 to 2 inclusive, and the sum of the numerical value of $x+y$ is always exactly 3.

The second type of reaction is:

(2) 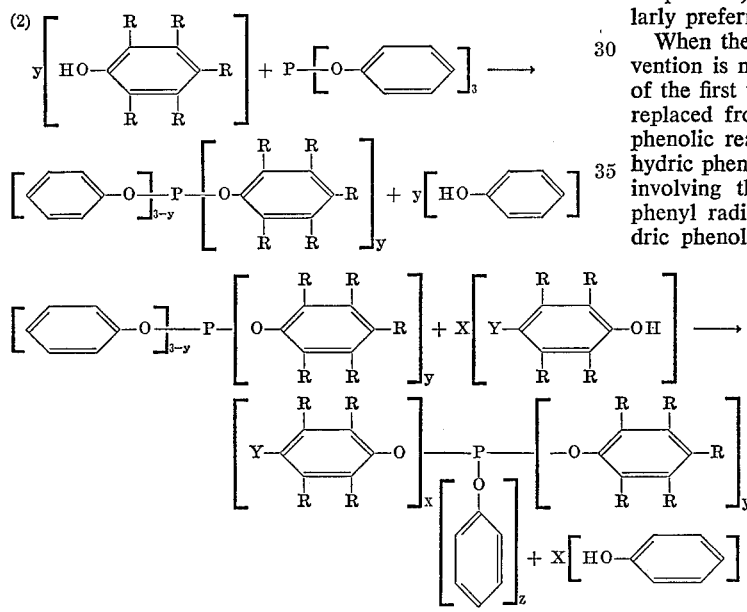

where $x$ is a number of from 1 to 3 inclusive, $y$ is a number of from 0 to 2 inclusive, $z$ is a number of from 0 to 2 inclusive, and $x+y+z$ is always exactly 3.

In each of the above types of reactions R may be hydrogen or an alkyl group, typically an alkyl group of from 1 to 18 carbon atoms. Preferably not more than two of the R groups at any one time on any given benzene ring are alkyl groups, the other R's being hydrogen. X represents a halogen atom (e.g., chlorine, bromine). Y may be hydroxyl, or the group represented by the formula:

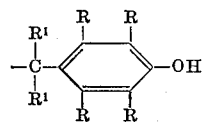

wherein R is as previously defined and $R^1$ is hydrogen or an alkyl group, usually a lower alkyl group of from 1 to 6 carbon atoms.

Highly reactive catalysts, e.g., lithium, sodium, etc., may or may not be used in the second type of reaction to help further said type reaction.

Examples of process reactants when the Y is a hydroxyl radical are: 2,5-di-t-amylhydroquinone (see R.P. #1 and #3), 2,5-di-t-butylhydroquinone (see R.P. #2, #5, and #6), 2,6-di-t-butylhydroquinone, 2,5-di-t-octylhydroquinone, t-butylhydroquinone, t-octylhydroquinone, dodecylhydroquinone, etc.

Examples of process reactants when Y is a group represented by the formula

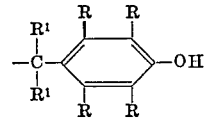

are: di-(t-butyl)-bisphenol A (see R.P. #4), 2,2'-dimethyl-6,6'-dinonyl bisphenol A (see R.P. #7), di-(t-octyl)-bisphenol A, 4,4'-butylidenebis (6-t-butyl-m-cresol), etc.

Examples of suitable optional monophenolic reactants are phenol itself, and such alkyl phenols as t-butyl phenol, octyl phenol, nonyl phenol, dodecyl phenol, octadecyl phenol, etc.

Preferred phenolic phosphite products of the foregoing kind for use in the invention are the alkyl phenolic phosphites. Preferred reactants are phenols and/or hydroquinones, and phenols and/or bis-phenols. The aforesaid with one or two (one, two, three or four in the case of bis-phenols) alkyl groups may be mentioned as particularly preferred.

When the phenolic phosphite chemical used in the invention is made from phosphorus trihalide by the route of the first type of reaction, all of the halogen is readily replaced from the phosphorus trihalide by the dihydric phenolic reactant (or the optional monophenol plus dihydric phenol). However, in the second type of reaction, involving the triphenyl phosphite, replacement of the phenyl radicals of the triphenyl phosphite by the dihydric phenol (or the optional monophenol plus dihydric phenol) proceeds less readily, but it is not necessary that all of the phenyl groups of the triphenyl phosphite be replaced. In fact, it is usually difficult to effect such complete replacement of the phenyl groups of the triphenyl phosphite. However, if in the second type of reaction all of the phenyl groups of the triphenyl phosphite are replaced, then the product is the same as the product obtained from phosphorus trihalide by the route of the first type of reaction.

The phenolic phosphite products of reaction type (1) and reaction type (2) are in any case believed to comprise material which may be represented by the general formula:

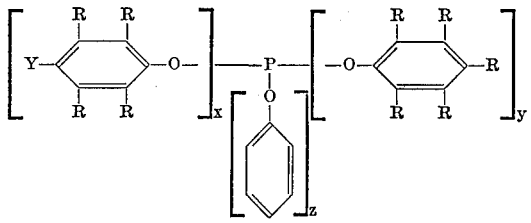

where $x$ is from 1 to 3, $y$ is from 0 to 2, $z$ is from 0 to 2, $x+y+z=3$, and R and Y are as previously defined. It will be understood that any given reaction product is not necessarily composed of a single chemical of the kind shown, but may be a mixture of chemicals. In the gross reaction product, $x$, $y$ and $z$ may have average values that are not whole numbers. For purposes of the invention it is neither necessary nor desirable to separate pure chemicals from the reaction product. In fact, the crude reaction product may in some cases be more effective than the purified chemical.

Accordingly, the phenolic phosphite chemicals employed in the invention may be described as:

(I) Reaction products of (a) a dihydric phenol of the formula

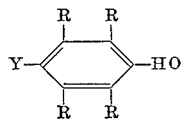

wherein R and Y are as previously defined with (b) phosphorus trihalide or triphenyl phosphite or (II) Reaction products of (a), (b), and (c), a monophenol of the formula

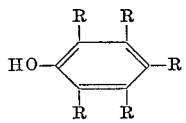

wherein R is as previously defined.

In Case (II) it is preferred to react the monophenol (c) with the phosphorus trihalide or triphenyl phosphite, prior to reaction with the dihydric phenol (a), as represented in the equations set forth above.

The thiodipropionic esters used in the invention in combination with the described phenol phosphites are primarily the dialkyl thiodipropionates, usually those in which the alkyl groups have at least 8 carbon atoms, and include dilauryl, distearyl, di(tridecyl), and the like.

The relative proportions of the three essential ingredients, (A) polypropylene, (B) phenolic phosphite, and (C) dialkyl thiodipropionate, are not critical, but it may be stated that satisfactory results are obtainable when the weight ratio of (B) to (C) is from 10:1 to 1:10, and the sum of (B) and (C) is from 0.5 to 5% of the weight of (A).

The preparation procedure of a few of the reaction products used in the subsequent examples (which show the distinct improvement in heat stability with no consequent loss in light stability) will presently be set forth. Also, the constituents in their molar amounts will be set forth for the other reactions whose reaction products are used in the subsequent examples.

R. P. #1

The reactants used in the preparation of reaction product #1 by the route of the first type of reaction were:

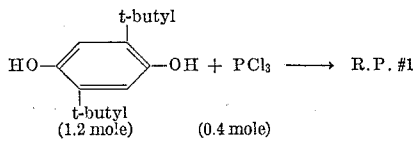

The 2,5-di-tert-butylhydroquinone (266 gms.) was entered into a one-liter, two-neck, round-bottom flask equipped with a thermometer, reflux condenser and CaCl₂ drying tube. Diethyl ether (500 ml.) was added and most of the 2,5-di-tert-butylhydroquinone dissolved. The PCl₃ (55 gms.) was added in three portions to the refluxing solution. After a reflux period of about two hours, ether was removed from the top of a Vigreux column. When the ether had been removed, a white solid remained in the flask. It was removed, ground up and some residual volatiles removed under vacuum.

R. P. #2

The reactants employed in the preparation of reaction product #2, again by the route of the first type of reaction, were:

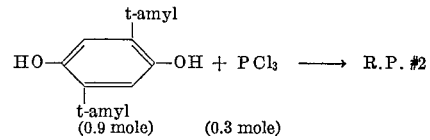

The 2,5-di-tert-amylhydroquinone (255 gms.) and diethyl ether (500 ml.) were combined in a one-liter, two-neck, round-bottom flask equipped with a thermometer and reflux condenser. One-half of the PCl₃ (41.2 gms.) was added to the refluxing solution. The other half was added an hour later. The mixture was refluxed overnight. The ether was removed and the product solidified. It was ground and vacuum stripped to remove volatiles.

R. P. #3

The reactants employed in the preparation of reaction product #3 by the route of the second type of reaction were:

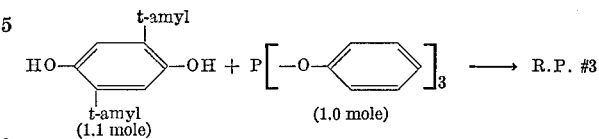

The 2,5-di-tert-amylhydroquinone (275 gms.) and triphenyl phosphite (310.3 gms.) were combined in a two-liter, round-bottom, two-neck flask equipped with a thermometer, distillation arm and receiver. The mixture stood overnight. The next day the flask was heated under vacuum and 1.095 moles (103.0 gms.) of phenol was distilled off. The residue from distillation weighed 463 g. (99.5% yield).

R.P. #4

The reactants employed in the preparation of reaction #4 by the route of the first type of reaction were:

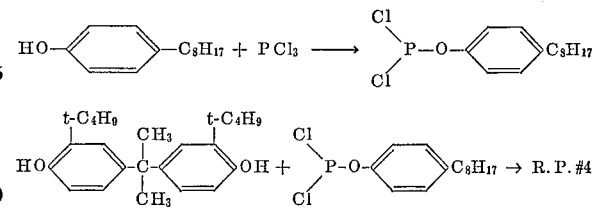

Three hundred and sixty-six grams (2.6 moles) of PCl₃ were placed in a dry, three-neck flask equipped with a mechanical stirrer, reflux condenser and a stopper. To the flask were then added 206.3 g. (1.0 mole) of p-octyl phenol (prepared by the alkylation of phenol with diisobutylene) and the resulting mixture was stirred at 65° C. until completion of the reaction. The condenser was replaced by a short distilling head and excess PCl₃ was flashed off. The product weighed 300 g. (98% of theory).

A solution of sixty-eight grams of di-t-butyl-bis-phenol-A in 206 g. of benzene was placed in a 3-neck flask fitted with a mechanical stirrer, distilling head and a gas bubble tube. To this were added 30.7 g. of the above-described intermediate reaction product with continuous stirring. The benzene was then removed by distillation and dry nitrogen was passed through the reaction mixture.

The reaction mixture was then heated slowly over a three hour period to a maximum temperature of 200° C. and was maintained at a temperature of from 190 to 200° C. for about 40 minutes. The reaction product was then cooled to room temperature and became a brittle, transparent, pale-yellow solid which was easily ground to a fine white powder by conventional means. The yield was 87.2 g. or 95% of theory. The preparation of a phenolic phosphite reaction product of this kind is set forth in U.S. Patent 3,112,286, Morris et al., Nov. 26, 1963.

Additional reactions exemplifying other embodiments of the two types of reactions previously outlined with other initial reactants are hereunder set forth:

R.P. #5

One mole PCl₃, 2 moles nonyl phenol, and 1 mole of 2,5-di-tert-butyl hydroquinone:

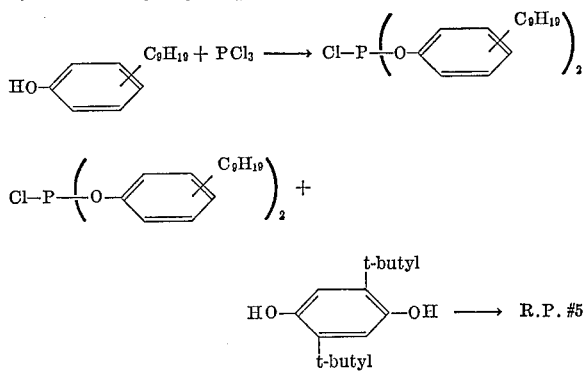

other values for R and R¹, and yet remain within the scope of the invention.

The following examples illustrate the beneficial effects of the above reaction products on the heat stability of polypropylene without loss of light stability or color in polypropylene.

EXAMPLE 1

This example illustrates the long term heat stability of polypropylene when stabilized with the synergistic composition of a phenolic phosphite and a dialkyl thiodipropionate. The example also shows that sample color is not adversely affected by heat when the synergistic composition is employed.

To test the heat stability of a material, the material in this case, polypropylene, containing the stabilizer(s) in question is molded into discs 90 mils thick. Three discs of each composition are exposed to a temperature of 300° F. in an air-circulating oven. When crumbling occurs on two of the three discs, the sample is reported as "broken." The following table, in which the amounts of chemicals tested are expressed as percent by weight of the polypropylene, shows the number of days required for break to occur.

TABLE I

| Sample No | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Composition Additives: | | | | | | | | | | | | | | |
| DLTDP | | .4 | .4 | .4 | .4 | .4 | .4 | .4 | .4 | | | | | |
| R.P. #1 | | | .1 | | | | | | | .1 | | | | |
| R.P. #2 | | | | .1 | | | | | | | .1 | | | |
| R.P. #3 | | | | | .1 | | | | | | | .1 | | |
| R.P. #4 | | | | | | .1 | | | | | | | .1 | |
| R.P. #5 | | | | | | | .1 | | | | | | | |
| R.P. #6 | | | | | | | | .1 | | | | | | .1 |
| R.P. #7 | | | | | | | | | .1 | | | | | |
| Heat Stability: | | | | | | | | | | | | | | |
| Days to sample break | <1 | 12-14 | 55-70 | 45 | 60 | 63 | 63 | 92 | 55 | 1 | 1 | 1 | 1 | 1 |
| Color Stability: | | | | | | | | | | | | | | |
| Initial Color [1] | W | W | W | W | W | | | | | W | W | W | W | W |
| Color at Break [1] | W | W | W | W | W | | | | | Y | Y | Y | Y | Y |

[1] W=White; Y=Yellow.

R.P. #6

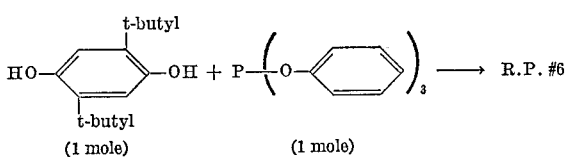

R.P. #7

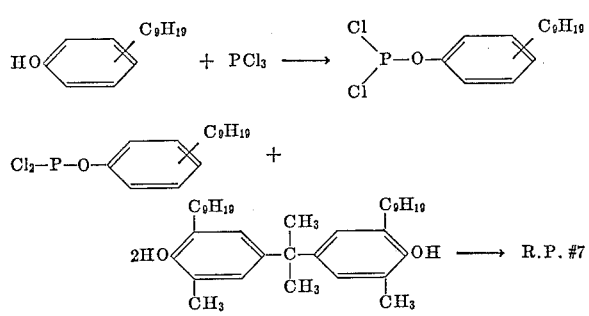

The bis-phenol used to prepare R.P. #7 may be made, for example, by reacting 15 moles of o-cresol, 6 moles of acetone and 16.5 moles of nonenes in the known manner.

In a manner similar to those outlined above, it will be obvious to those skilled in the art that the molecular proportions of the various reactants in the above reactions may be varied as well as the substitution of In the above table "DLTDP" stands for dilauryl thiodiproprionate.

Samples 3 to 9 represent the practices of the invention. It is readily apparent that the samples 3 to 9 of the invention give greatly improved heat stability in comparison to a blank (sample 1), and DLTDP alone (sample 2). Also, the results of samples 10 to 14, containing the phenolic phosphite only, very favorably depict the inventive synergetic combination as samples 10–14 each broke in less than one day.

In the prior art, some known stabilizers for polypropylene tend to discolor the polymer upon lengthy exposure to heat. However, it can also be seen from the data that the synergistic combination of a phenolic phosphite plus DLTDP does not lead to discoloration of the sample upon exposure to heat.

EXAMPLE 2

This example illustrates that the synergistic composition does not adversely affect light stability as measured by hours to sample embrittlement, nor does it adversely affect color of the sample when exposed to light. This feature is especially important in view of the fact that some conventional phenolic stabilizers in use become embrittled on continued exposure to strong light. Although primarily heat stabilizers, the synergistic compositions should be stable to light and relatively nondiscoloring under light aging conditions, too.

To conduct the light stability test, 20 mil films of polypropylene containing the material(s) to be evaluated are exposed in a single arc Fade-Ometer until embrittlement occurs.

TABLE II

| Sample No | A | B | C | D | E |
|---|---|---|---|---|---|
| Composition Additives: | | | | | |
| DLTDP | .4 | .4 | .4 | .4 | |
| R.P. #1 | | .1 | | | |
| R.P. #2 | | | .1 | | |
| R.P. #3 | | | | .1 | |
| Light Stability: | | | | | |
| Hours to sample embrittlement | 80 | 240 | 440 | 400 | 320 |
| Color Stability | A | B | C | D | E |
| Initial color [1] | W | W | W | W | W |
| Color at time of embrittlement [1] | W | W | W | W | W |

[1] W=White.

Certain of the phenolic phosphite chemicals disclosed herein are claimed as new chemicals in my copending application Ser. No. 506,881, filed of even date herewith.

Having thus described my invention, what I claim and desire to protect my Letters Patent is:

1. A composition comprising, in admixture, (A) polypropylene
   (B) a reaction product selected from the group consisting of
      (I) reaction products of (a) and (b), and
      (II) reaction products of (a), (b) and (c),
      (a) being a chemical of the formula,

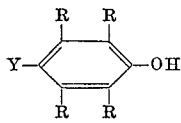

in amount of from 1 to 3 moles,
      (b) being a chemical selected from the group consisting of phosphorous trihalide and triphenyl phosphite, in amount of 1 mole, and (c) being a chemical of the formula

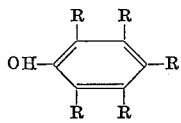

in amount of from 0 to 2 moles, wherein Y is hydroxyl, and R is selected from the group consisting of hydrogen and alkyl having 1 to 18 carbon atoms, and
   (C) a dialkyl thiodipropionate in which the alkyl groups have at least 8 carbon atoms, the weight ratio of (B) to (C) being from 1:10 to 10:1 and the sum of (B) and (C) being from 0.1 to 5% based on the weight of (A), and the said (B) and (C) serving as stabilizers for the polypropylene.

2. A composition as in claim 1 in which (B) is a reaction product of 3 moles of (a) 2,5-di-tert-butyl-hydroquinone and 1 mole of (b) phosphorous trichloride.

3. A composition as in claim 1 in which (B) is a reaction product of 3 moles of (a) 2,5-di-tert-amylhydroquinone and 1 mole of (b) phosphorous trichloride.

4. A composition as in claim 1 in which (B) is a reaction product of about 1 mole of (a) 2,5-di-tert-amylhydroquinone and 1 mole of (b) triphenyl phosphite.

5. A composition as in claim 1 in which (B) is a reaction product of 2 moles of (c) nonylphenol, 1 mole of (b) phosphorous trichloride, and 1 mole of (a) 2,5,-di-t-butylhydroquinone.

6. A composition as in claim 1 in which (B) is a reaction product of 1 mole of (a) 2,5-di-tert-butylhydroquinone and 1 mole of (b) triphenyl phosphite.

7. A composition as in claim 1 in which (a) is a dialkylhydroquinone.

8. A composition as in claim 1 in which (a) is a dialkylhydroquinone and (c) is an alkylphenol.

References Cited

UNITED STATES PATENTS

| 2,612,488 | 9/1952 | Nelson | 260—45.7 |
| 3,112,286 | 11/1963 | Morris | 260—45.7 |
| 3,245,949 | 4/1966 | Murdock | 260—45.7 |
| 3,297,631 | 1/1967 | Bown | 260—45.7 |

OTHER REFERENCES

Crystalline Olefin Polymers by Raff, 1964 Edition, Interscience Publishers, p. 383.

DONALD C. CZAJA, *Primary Examiner.*

V. P. HOKE, *Assistant Examiner.*